United States Patent
Kitaoka

(10) Patent No.: US 6,342,177 B1
(45) Date of Patent: Jan. 29, 2002

(54) METHOD FOR PRODUCTION OF METAL OXIDE THIN FILM

(75) Inventor: Kenji Kitaoka, Kawanichi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/280,647

(22) Filed: Mar. 29, 1999

(30) Foreign Application Priority Data

| Mar. 30, 1998 | (JP) | 10-083453 |
| May 15, 1998 | (JP) | 10-133043 |
| Sep. 25, 1998 | (JP) | 10-271225 |

(51) Int. Cl.$^7$ .......................... C04B 35/624
(52) U.S. Cl. ............... 264/307; 264/621; 264/309; 264/345; 427/335; 427/376.2
(58) Field of Search ................ 264/621, 307, 264/309, 345; 427/335, 376.2

(56) References Cited

U.S. PATENT DOCUMENTS 5,076,980 A * 12/1991 Nogues et al. .................. 501/12
5,453,294 A 9/1995 Ogi et al.
5,753,305 A * 5/1998 Smith et al. .................. 427/335

FOREIGN PATENT DOCUMENTS

| JP | 62-27482 | 6/1987 |
| JP | 06005946 | 1/1994 |
| JP | 6-157033 | 6/1994 |

* cited by examiner

Primary Examiner—James Derrington
(74) Attorney, Agent, or Firm—McDermott, Will & Emery

(57) ABSTRACT

The present invention relates to a method for production of a metal oxide thin film and a method for production of an arrayed metal oxide functional device, comprising the steps of:

preparing a sol containing a material and a solvent;
gelating the sol to give a gel member;
processing the gel member under a pressure of not less than 0.2 MPa at 100 to 400° C. in a water-vapor-containing atmosphere; and
conducting a heat treatment on the water-vapor-processed gel member at 200 to 400° C.

4 Claims, 6 Drawing Sheets

FIG. 7(b) (ii)

FIG. 7(c) (iii)

METHOD FOR PRODUCTION OF METAL OXIDE THIN FILM

This application is based on applications Nos. Hei 10-083453, Hei 10-133043, and Hei 10-271225 filed in Japan, the contents of which is hereby incorporated by reference.

BACKGROUND OF THE INVENTION

1. Field of the Invention

The present invention relates to a method for production of a metal oxide thin film and an arrayed metal oxide functional device having a high quality capable of being used for various purposes, and more particularly to a method for production of a thin film and a functional device, made of a metal oxide which is useful as a material for optical modulators, ferroelectric memories, dielectric films for ICs, optical shutters, actuators, and micromachines that are widely used in the field of communication devices.

2. Description of the Related Art

In a general production method of a metal oxide thin film according to a sol/gel method, a sol is applied onto a substrate material and is dried to give a gel, followed by a heat treatment or radiation of high energy ultraviolet rays such as an excimer laser beam to decompose and remove organic substances contained in the starting material so as to give the metal oxide film. At this time, if the organic substances in the film are strongly bonded to metal ions, a heat treatment temperature for removing the organic substances must be high. If the speed of raising the temperature for the heat treatment is increased, the densification caused by the heat treatment on the surface film proceeds at a higher speed than that in the inside of the film, so that the organic substances are enclosed in the film. As a result, voids are formed after the removal of the organic substances by a final heat treatment at a high temperature, so that a dense film cannot be formed. This problem can be solved to some extent by lowering the speed of raising the temperature at the heat treatment, but not satisfactorily.

U.S. Pat. No. 5,453,294 discloses production of a PZT thin film by the sol/gel method in which a starting material solution is applied onto a substrate and then, after thermal decomposition at 150 to 250° C., 250 to 350° C., or 450 to 550° C., crystallization is carried out at 550 to 800° C. This method may control the orientation of crystals by using different temperatures for the thermal decomposition and the crystallization.

However, since the thermal decomposition and the removal of the organic substances before the crystallization are insufficient, the density of the obtained film is considerably poor.

Japanese Patent Application Laid-open No. Hei 6-5946 discloses production of a PZT thin film by the sol/gel method in which a process of applying a starting material solution onto a substrate, drying the substrate at 200 to 300° C., and calcining the substrate at 650° C. in an oxygen atmosphere is repeated to obtain a given thickness, and then calcining the substrate in an ozone atmosphere to prevent formation of oxygen holes in the crystal structure. However, since the organic substances cannot be removed to a sufficient extent simply by adjusting the condition at the thermal decomposition step, so that the density of the film is poor.

Japanese Patent Application Publication No. Sho 62-27482 and Japanese Patent Application Laid-open No. Hei 6-157033 disclose production of a metal oxide thin film by the sol/gel method in which a starting material is applied onto a substrate and then the substrate is exposed to an atmosphere containing a water vapor, followed by a heat treatment. The exposure to water vapor in this method may not be effective compared with the known hydrolysis by moisture present in an ambient atmosphere when the substrate is left to stand in the ambient atmosphere. Particularly, if the thickness of the film to be applied exceeds about 0.5 μm, the penetration of water vapor into the gel film is poor, so that the degree of hydrolysis will be different between the surface and the inside of the film, producing adverse effects on the film quality after the calcination. Also, in view of the productivity, it is required that the sol is stable against hydrolysis for a long period of time before its application onto a substrate. However, if the sol is highly stable against hydrolysis, a simple introduction of water vapor cannot produce sufficient hydrolysis even if the substrate is left in that state for a long period of time.

Meanwhile, a research is conducted in which a metal oxide material is applied to functional devices by utilizing the various properties of the metal oxide. For example, (Pb,La)(Zr,Ti)O$_3$ (hereafter referred to as PLZT) has a crystal structure of perovskite type and is known to have a large secondary electrooptical effect (Kerr effect), so that PLZT can be applied to optical shutters, optical modulators, ferroelectric memories, and others. For example, by arranging PLZT fibers in an array, an optical shutter device capable of processing a plurality of beams in parallel can be realized. Also, Pb(Zr,Ti)O$_3$ (hereafter referred to as PZT) has a crystal structure of perovskite type and is known to have a large piezoelectric effect, so that PZT can be applied to actuators and others.

Conventionally, in applying such a metal oxide to the above-mentioned functional devices, the metal oxide is first molded into a fine shape such as a fiber shape with a diameter of 5 to 100 μm, followed by arranging the obtained molded products into a desired array. For example, in producing a PLZT fiber array, gel fibers are spun from a concentrated sol and arranged on a substrate to fabricate the fiber array. It is believed that the fiber array obtained by the sol/gel method can have a higher density for improving the efficiency by reducing the diameter of the fiber and arranging the fibers with a shorter pitch, as compared with those fabricated by a bulk-type machanical process.

However, the above technique requires a work of arranging the molded products, which has been formed in a fine shape, in an array on a substrate, so that the handling of the PLZT fiber whose material strength is not so large as a general glass fiber is difficult and it requires a careful attention. Therefore, in order to densify the fibers on the substrate by reducing the diameter of the fibers and arranging them with a shorter pitch, the work of arranging individual fibers becomes more difficult as the diameter of the fibers is reduced and the pitch is made shorter. This leads to increased costs due to poorer productivity caused by breakage of the fibers and the like.

Another method for producing functional devices by molding a metal oxide into a fine shape is reported in which a sol is applied onto a substrate material to obtain a gel film and then giving a fine convex-concave shape to the gel by stamping in fabricating a thin film by the sol/gel method (Kinki University; Tsutomu Minarni and Noboru Toge; HYBRIDS, Vol. 7, No. 5, pp. 15–21 (1994)). However, by such a method, the size to which the convex and concave shape can be given is limited to a degree of submicron order and, moreover, the shape that can be given is a simple convex and concave shape, so that it is extremely difficult to apply such a method to functional devices such as optical shutter devices and actuators.

SUMMARY OF THE INVENTION

The present invention has been made in view of the above circumstances and the purpose thereof is to solve the above-mentioned problems of the prior art methods of producing a metal oxide thin film by the sol/gel method and to provide a method for production of a highly dense and high-quality metal oxide thin film and a method for production of a functional device in which metal oxides having a fine shape are arranged in an array, with good productivity and at low costs.

The present invention relates to a method for production of a metal oxide thin film and a method for production of an arrayed metal oxide functional device, comprising the steps of:

preparing a sol containing a material and a solvent;
gelating the sol to give a gel member;
processing the gel member under a pressure of not less than 0.2 MPa at 100 to 400° C. in a water-vapor-containing atmosphere; and
conducting a heat treatment on the water-vapor-processed gel member at 200 to 400° C.

DETAILED DESCRIPTION OF THE INVENTION

Figure 1:
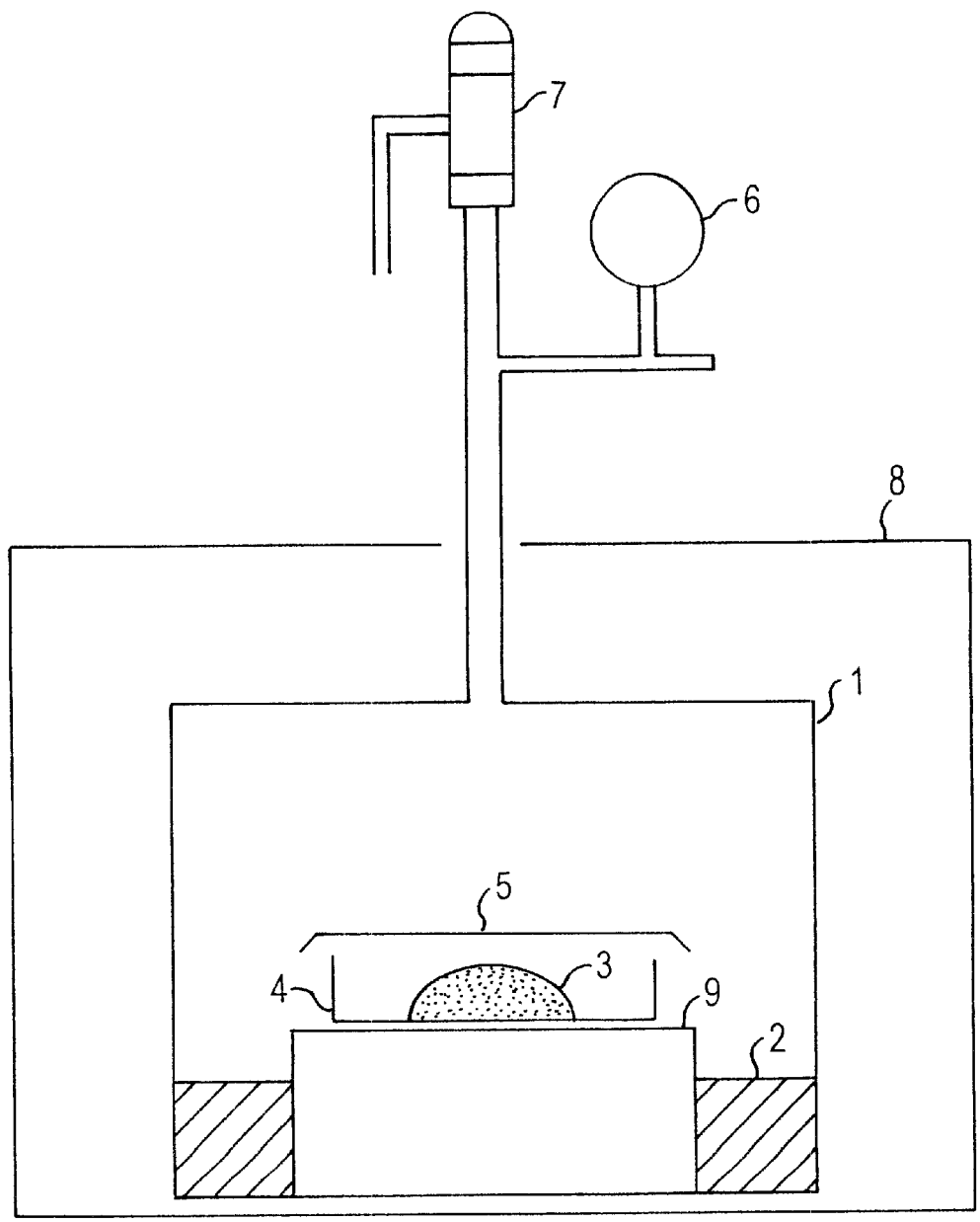
FIG. 1 is a schematic construction view illustrating an embodiment of a high-temperature high-pressure water vapor processing apparatus according to the present invention.

A first aspect of the present invention relates to a method for production of a metal oxide thin film, comprising the steps of:

preparing a sol containing a material and a solvent and forming a thin film using the sol;

gelating the thin film of the sol to give a gel film;
processing the gel film under a pressure of not less than 0.2 MPa at 100 to 400° C. in a water-vapor-containing atmosphere; and
conducting a heat treatment on the water-vapor-processed film at 200 to 400° C.

A second aspect of the present invention relates to a method for production of a functional device made of a metal oxide, comprising:

a first step of preparing a sol containing a material and a solvent and molding the sol using a mold;
a second step of gelating the sol to give a gel member; and
a third step of solidifying the obtained gel member to produce a metal oxide.

First, the first aspect of the present invention will be explained.

The material used for preparing the sol contains an organic material, such as an organic metal compound or a compound containing a desired metal (also referred to as an organic metal compound in the present invention). As such an organic metal compound, an organic compound containing a desired metal may suitably selected from various organic metal compounds that are conventionally used in the field of the art. The following compounds may be given as examples thereof without intention to limit to them.

(1) Metal alkoxides:lanthanum isopropoxide, zirconium propoxide, titanium isopropoxide, and niobium ethoxide.
(2) Metal salts of carboxylic acids:barium naphthenate, lead octylate, lead naphthenate, lead acetate, lead acetylacetonate, and lanthanum acetate.
(3) Metals:lithium and barium.

Two or more of these organic metal compounds may be used in combination. Metal such as lithium may be suitably blended in a starting material, if desired, in accordance with the composition of the metal oxide.

A lower alcohol, especially ethanol, 2-methoxyethanol, or the like, is typically used as a solvent for dispersing or dissolving a material containing the organic metal compound. However, other solvents such as acetic acid may be suitably used as well.

The concentration of the material containing the organic metal compound depends on the material, the solvent, and the like, and is not particularly limited. However, the dispersion concentration is typically 0.1 to 1.0 mol %, preferably 0.3 to 0.8 mol %.

In this case, a stabilizing agent such as acetylacetone, diethanolamine or β diketone may be contained in order to prepare a stable sol that undergoes little change with time. An amount of such a stabilizing agent is typically 0.01 to 1.0 mol %, preferably 0.02 to 0.5 mol %.

A thin film is formed of the sol prepared above to form a gel film. The forming of the thin film of the sol is typically conducted on a surface of a heat-resistant substrate, for example, a silicon substrate, a stainless steel substrate, or a glass substrate, each of which may be coated with platinum, a glass substrate coated with a transparent electrode such as ITO, or the like. The casting of the sol onto the substrate may be carried out by a conventional method such as spin coating, dip coating, or spray coating.

A thickness of the applied sol is not limited, but is typically 100 to 10000 nm, preferably 100 to 500 nm.

The thin film of the applied sol is gelated by leaving the sol film to stand at a room temperature. The gelation proceeds as the solvent is vaporized through the sol thin film. The gelation may be promoted by heating.

The gel film formed on the substrate after casting the sol is processed in a water-vapor-containing atmosphere under a pressure of not less than 0.2 MPa, preferably 0.5 to 2.0 MPa, and at 100 to 400° C., preferably 130 to 200° C. The processing time is typically 15 minutes to 5 hours, preferably 30 minutes to 2 hours. This high-pressure high-temperature process with water vapor allows effective hydrolysis of the organic metal compound and effective removal of generated organic substances. In this case, if the processing pressure is lower than 0.2 MPa, the hydrolysis reaction will not occur sufficiently, so that it is difficult to remove the organic substances in heat treatments performed in the later steps. If the processing temperature is lower than 100° C., the amount of water vapor will be insufficient, so that the hydrolysis reaction does not occur sufficiently, raising the same problem as mentioned above. On the other hand, if the processing temperature is higher than 400° C., the organic substance will be carbonized, so that it will be more difficult to remove the organic substances.

Usually, this treatment with water vapor is carried out in air. It may be carried out in an atmosphere such as nitrogen gas or argon gas.

The thin film obtained by the above high-pressure high-temperature processing with water vapor is then subjected to a heat treatment at 200 to 400° C., preferably 300 to 400° C. The heat treatment time is typically 30 minutes to 4 hours, preferably 1 to 2 hours.

The thin film prepared by the high-pressure high-temperature processing with water vapor has open holes of nm order connected from the inside to the outside, so that the free organic substances and carbon components remaining in the film are effectively discharged to the outside of the film through the open holes. However, if the heat treatment temperature is higher than 400° C., the open holes are closed. The free organic substances and carbon components are enclosed in the film, so that it is not preferable. If the heat treatment temperature is lower than 200° C., it is not possible to discharge the organic substances and carbon components of these kinds remaining in the film sufficiently to the outside of the film, so that it will be difficult to obtain a high-quality metal oxide thin film.

The metal oxide thin film obtained by the above method typically has a thickness of 100 to 10000 nm, and is a highly dense thin film in an amorphous state.

If a thin film having a larger thickness is required, the above processing operation may be suitably repeated. However, it is to be noted that, if the heat treatment is repeated at an excessively high temperature, the interface of the successively formed thin films will become a particle boundary, making it difficult to obtain a metal oxide thin film having a good orientation. On the other hand, if the temperature in the repeated heat treatment is too low, the carbon components and undecomposed organic substances will remain in the film, thereby forming a porous film in a later-performed heat treatment for crystallization. Usually, the repeated heat treatment is preferably carried out at a temperature of 300 to 400° C.

If a highly crystalline and highly dense thin film is required, the highly dense amorphous thin film obtained in the above step may be subjected to a further heat treatment at not less than 400° C., preferably 500 to 800° C. The heat treatment time is typically 10 minutes to 2 hours, preferably 30 minutes to 1 hour. The heat treatment atmosphere is typically air in this case as well. However, it may be an atmosphere of nitrogen gas or argon gas.

The second aspect of the present invention will be explained.

The material used in the first step of the production method according to the second aspect of the present invention may be a material containing a metal compound. The metal compound as the starting material may be either an organic or inorganic compound as long as an amorphous, polycrystalline, or glass ceramics fiber of the metal oxide capable of constituting the final functional device is formed. In the first step, such a material is dissolved in an alcohol solvent to prepare a homogeneous sol solution.

The metal oxide capable of constituting the functional device is represented, for example, by the formula ABO3, in which A and B represent the following elements; A contains Li, Na, Pb, Bi, or a mixture thereof as a major component and may further contain any of La, Gd, Ca, Sr, Ba, Y, Ce, Pr, Nd, Sm, Eu, Tb, Dy, Ho, and Cd mixed therewith; and B contains Ti, Zr, Nb, Ni, Ta, or a mixture thereof as a major component and may further contain any of Sn, Hf, V, Mg, W, Mo, Mn, Sb, Cr, Fe, Zn, Sc, Si, Ge, Te, Al, and Co mixed therewith.

The metal compound capable of constituting the metal oxide may be a mixture of at least one element selected from the A metals and at least one elements selected from the B metals. In view of the facility in preparing a homogeneous sol solution, the metal compound is preferably composed of an alkoxide, acetate, or acetylacetonate compound of at least one metal selected from the A metals and an alkoxide, acetate, or acetylacetonate compound of at least one metal selected from the B metals. If the metal compound is a metal oxide composed of A and B, the metal oxides will be a material having a comparatively high refractive index and exhibiting electrooptical properties, being suitable for arrangement thereof in an array in the functional device as a final product.

Instead of containing an alkoxide, acetate, or acetylacetonate, the starting material may be a compound so long as any of these compounds may be synthesized by hydrolysis or polymerization reaction under a given condition. For example, a metal itself, a chloride, a nitrate, or the like may be subjected to chemical reaction under a given condition to give the alkoxide, acetate, or acetylacetonate.

Preferable metal compounds to be used in the present invention are acetates and alkoxides of lead, lanthanum, zirconium, and titanium in synthesizing (Pb,La)(Zr,Ti)$O_3$ (PLZT). In particular, they may be, for example, lead acetate trihydrate, lanthanum isopropoxide, zirconium propoxide, titanium isopropoxide, and others. In synthesizing Pb(Zr,Ti)$O_3$ (PZT), they are acetates and alkoxides of at least lead, zirconium, and titanium, for example, a mixture of lead acetate trihydrate, zirconium propoxide, titanium isopropoxide, and others. In synthesizing PbTiO$_3$, they are acetates and alkoxides of at least lead and titanium, for example, a mixture of lead acetate trihydrate, titanium isopropoxide, and others. In synthesizing LiNbO$_3$, they are metals and alkoxides of at least lithium and niobium, for example, a mixture of metal lithium, niobium ethoxide, and others. In synthesizing LiTaO$_3$, they are metals and alkoxides of lithium and tantalum, for example, a mixture of lithium metal, tantalum ethoxide, and others. In synthesizing Pb(Ni,Nb)O$_3$, they are metals and alkoxides of at least lead, nickel, and niobium, for example, a mixture of lead metal, nickel acetylacetonate, niobium ethoxide, and others. The components in the metal compound may be mixed at a ratio corresponding to the molar ratio of the metal oxide to be obtained as a final product.

The solvent contained in the sol may be an alcohol solvent or other solvents as long as it can homogeneously dissolve the above-mentioned metal compounds such as alkoxides, acetates, acetylacetonates, and others. The most suitable solvent with respect to the metal compounds may be selected by taking the boiling point, the solubility of the metal materials, the stability, and others into account. Such a solvent may be, for example, an alcohol alone or a mixture of two or more alcohols, more specifically, a mixture of 2-methoxyethanol or 2-methoxyethanol and ethanol.

In view of the stability of the sol to be obtained, water may be mixed in preparing the solvent. This water may be introduced as water of crystallization in the metal compound, water in the alcohol as the solvent, or a moisture in the ambient atmosphere. They may be used in combination.

As described above, a material containing the metal compounds is dissolved in the alcohol solvent to prepare a homogeneous sol. At this time, the molar number of the solvent is preferably 5 to 10 times the total molar number of metals in the metal compounds. Also, the concentration of water is preferably adjusted so that the molar number of water is 0.3 to 3 times the total molar number of metals in the material.

Then, the obtained sol is preferably concentrated to give a highly viscous sol. The concentration may be carried out by any method or means as long as the solvent can be evaporated. However, in order to prevent cracks and fractures at the solidification in the succeeding step, the amount of contraction in the drying and heat treatment steps is preferably as small as possible. On the other hand, if the amount of solvent is too small, the fluidity of the sol will be poor. Therefore, the viscosity of the sol is preferably about 2,000 to 200,000 mPas. The sol to be used in the present invention represents a solution in which a polymer of submicron order or less or complex ions are uniformly dissolved.

In producing a metal oxide material by a sol/gel method according to the prior art, an acid catalyst such as nitric acid is usually added to promote the hydrolysis and polymerization. However, if the acid catalyst is added, the hydrolysis and the polymerization proceed with time. Therefore, even while the sol is formed into fibers, the reaction proceeds with time. The viscosity of the highly viscous sol changes at every moment. Accordingly, in the present invention, it is preferable to use the above-mentioned highly viscous sol having an extremely excellent storage stability in which such a catalyst is not added. Since the above-mentioned highly viscous sol does not contain an acid, deterioration of metal components in a production equipment does not occur, so that it is more preferable.

The obtained sol is molded using a mold to give a sol member. To be more in detail, the mold has a molding surface formed in an array by which the desired metal oxide shape can be transcribed and the obtained sol members can be arranged in an array. The mold is filled with the sol. In the present invention, since the sol is molded by using such a mold, gel members having various shapes can be obtained. This may lead to production of a functional device in which fine metal oxides are arranged in an array with ease and good productivity. In this specification, the term "array" or "in an array" represents an arrangement of metal oxides required in the desired functional device and, particularly, it represents an ordered arrangement if the functional device to be obtained is an optical shutter array, an optical switch, or the like.

Figure 8:
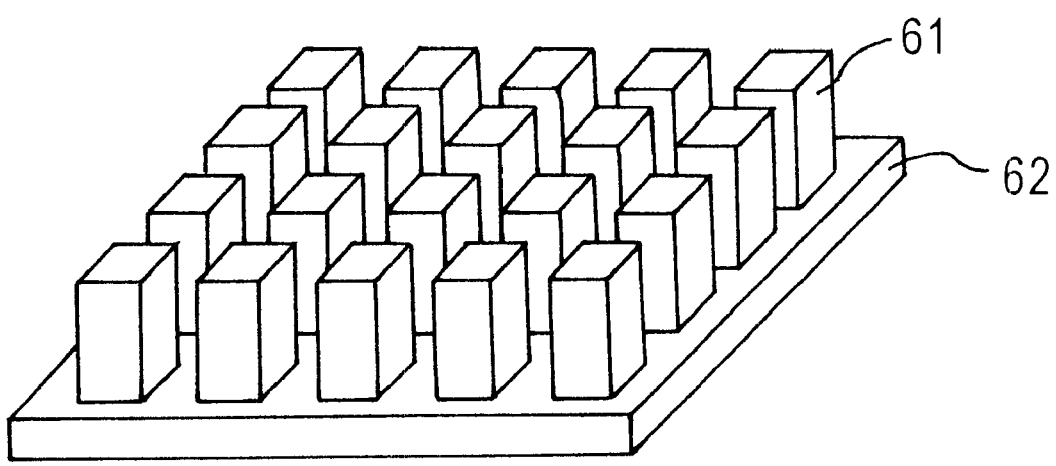
FIG. 8 is a schematic perspective view illustrating an example of a matrix-type optical shutter array.

The shape to be transcribed on the surface of the mold is not specifically limited and it may be any shape, such as prismatic, cylindrical, elliptical tubular, or a pillar-like shape having a trapezoidal cross section. It is possible to produce a functional device in which the metal oxides (61) are independently arranged on a substrate (62) as shown in FIG. 8 by forming concave and convex portions at a given interval on the surface of the mold. The surface of the mold may be processed by anisotropic etching or isotropic etching in the case where the mold material is Si, by press molding in the case where the mold material is glass, and by mechanical processing by a diamond cutter in the case where the mold material is ceramics or polyacetal resin.

A releasing agent such as paraffin is preferably applied onto the molding surface of the mold so that cracks are not generated in the metal oxide during the later-performed releasing step. Especially, if the mold is filled with the sol by injection molding, it is preferable that the releasing agent is applied onto the upper molding surface of the mold.

The material for the mold may be, for example, a Si wafer, silica glass, nonalkaline glass, teflon or polyacetal resin having a poor wettability with ceramics materials such as a Si wafer, silica glass, nonalkaline glass or alumina, or a photoresist that can be easily patterned.

A means for filling the mold with the sol for molding is not specifically limited as long as the sol can be molded into a desired shape. It is, however, preferable that the injection molding or cast molding is carried out using the mold (See FIGS. 3 and 4).

Figure 3A:
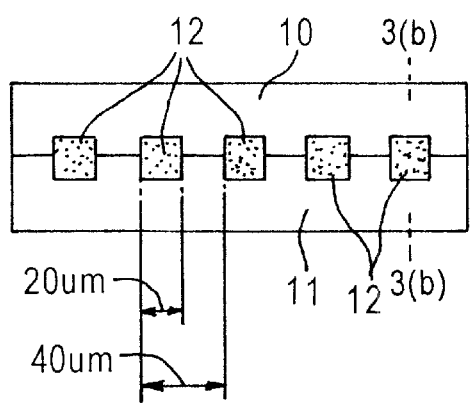
FIG. 3(a) is a schematic sectional view seen from the direction of fiber axis, illustrating an injection molding apparatus to be used in producing an optical shutter array.
Figure 3B:
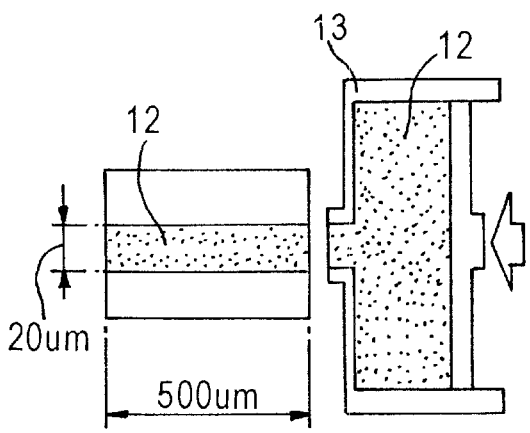
FIG. 3(b) is a schematic cross-sectional view cut along the A–A' line of FIG. 3(a)

For example, if the injection molding is to be carried out, an injection molding apparatus shown in FIGS. 3(a) and 3(b) can be used. FIG. 3(a) is a schematic sectional view seen from the direction of fiber axis, illustrating an injection molding apparatus to be used in producing an optical shutter array. FIG. 3(b) is a schematic cross-sectional view cut along the A–A' line of FIG. 3(a). The sol (12) is introduced between upper and lower molds (10), (11) by an injection apparatus (13). Although the mold is processed in an array shape with a dimension and a pitch described in FIGS. 3(a) and 3(b), the shape of the mold is not specifically limited as long as a gel member of a desired shape can be obtained.

Figure 4A:
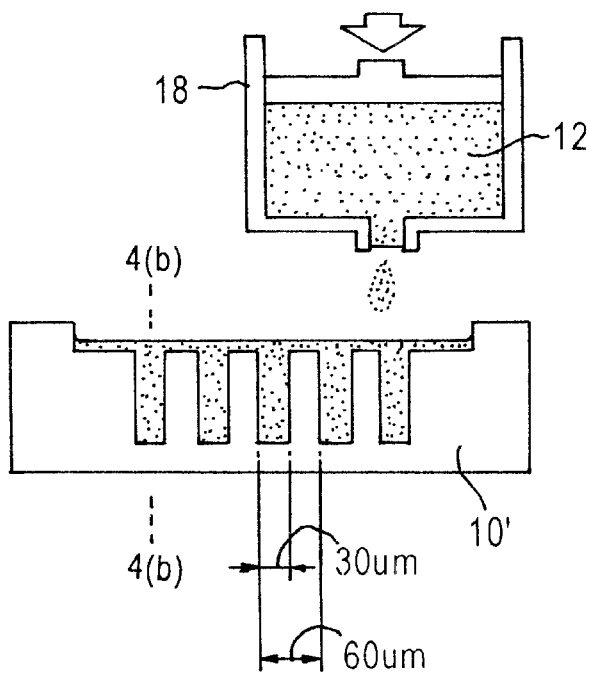
FIG. 4(a) is a schematic view illustrating a cast molding apparatus to be used in producing an optical shutter array.
Figure 4B:
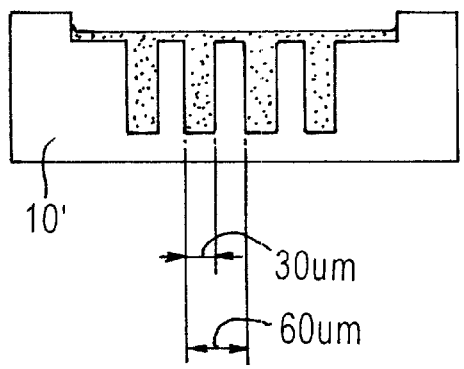
FIG. 4(b) is a schematic cross-sectional view cut along the B–B' line of FIG. 4(a)

If the cast molding is to be carried out, a cast molding apparatus shown in FIGS. 4(a) and 4(b) can be used. FIG. 4(a) shows a schematic cross-sectional view of an injection apparatus and a mold to be used in producing an optical shutter array as illustrated in FIG. 8. FIG. 4(b) shows a schematic cross-sectional view cut along the B–B' line of FIG. 4(a). The sol (12) is introduced into the mold (10') by the injection apparatus (18). Although the mold is processed in an array shape with a dimension and a pitch described in FIGS. 4(a) and 4(b), the shape of the mold is not specifically limited as long as a gel member of a desired shape can be obtained.

After the sol is introduced into the mold, the sol is left to stand quietly in that state for several hours to about three days at room temperature for gelation. The gelation proceeds gradually by evaporation of the solvent while the sol is left to stand quietly. This gelation can be promoted by heating in an oven or the like.

In the succeeding step, the gel member obtained in the above step is solidified by a heat treatment to give a metal oxide. By this step, the gel member is vitrified and/or crystallized. The term "vitrification" is used to include making the gel member amorphous, and the term "crystallization" is used to include making the gel member polycrystalline or into glass ceramics. In this step, if the injection molding is carried out in the above step, the upper mold should preferably be released so as to achieve more efficiency.

In the above step of the present invention, it is preferable that the gel member obtained in the first step is exposed to vapor containing a water vapor before the solidification of the gel member. This exposure promotes the hydrolysis and polymerization of the metal compounds and achieves a state in which the organic substances, which are the causes of the voids formed in the metal oxide to be obtained, can be removed at a lower temperature. A complete removal of the organic components is made possible before the densification at a high temperature and the formation of voids can be prevented.

Accordingly, in a preferable embodiment of the solidifying step of the method of the present invention, specifically, the gel member is exposed to vapor containing a water vapor at a temperature of 100 to 400° C., preferably 150 to 300° C., and at a pressure of not less than 0.12 MPa, preferably not less than 1.2 MPa, followed by a heat treatment at 200 to 400° C. for solidification. If the temperature for exposing the gel member to the vapor containing a water vapor is less than 100° C., the hydrolysis reaction is not promoted. If the temperature exceeds 400° C., the sintering of the gel member due to the heat occurs, resulting in that the organic substances are more liable to be enclosed inside the film with decrease in the efficiency of preventing voids and with decrease in the transparency. If the exposure pressure is less than 0.12 MPa, it is necessary to maintain the gel member at a high temperature for a long time, leading to increased costs. In the above-mentioned preferable temperature range of 150 to 300° C., the exposure time can be shortened as the processing temperature is higher or as the pressure is higher. A further reduction of costs can be achieved. In this temperature range, a higher processing temperature is more advantageous in view of the reactivity of the hydrolysis.

Figure 5:
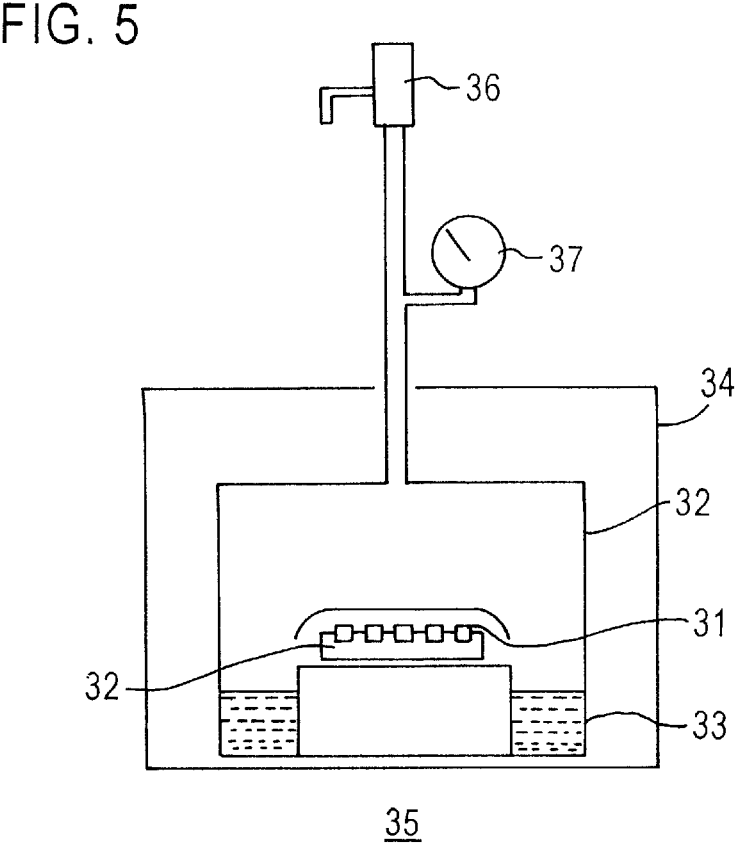
FIG. 5 is a schematic cross-sectional view illustrating an example of an apparatus for exposing a gel member to a vapor containing a water vapor under a heated and pressurized atmosphere.

FIG. 5 is a schematic cross-sectional view illustrating an example of an apparatus for exposing a gel member to a vapor containing a water vapor under a heated and pressurized atmosphere (hereafter referred to simply as a "water vapor exposure apparatus"). The gel member (31) on the mold (32) introduced into the water vapor exposure apparatus (35) can be exposed to a vapor containing a highly pressurized water vapor formed by heating water (33) in the pressure-resistant closed container (32) by an oven (34). The pressure can be suitably adjusted by a pressure meter (37) and a relief valve (36). By allowing the water vapor to be highly pressurized, the water vapor permeates into the gel member (31), so that the unreacted metal materials are hydrolyzed more efficiently than the case where no pressure is applied. This contributes to removal of the organic substances.

In another preferable embodiment of the solidifying step of the method of the present invention, the gel member is exposed to a vapor containing a water vapor in a carrier gas flow of air, oxygen, ammonia gas, or the like under an atmospheric pressure at a temperature of 100 to 400° C., and then is allowed to contact with water, followed by a heat treatment at 200 to 400° C. for solidification. By exposing the gel member to a vapor containing a water vapor in a carrier gas flow and then allowing it to contact with water, the metal compound can be hydrolyzed almost completely. The densification of the metal oxide (making the metal oxide transparent) in the later-performed heat treatment may be promoted. The water vapor exposure process under the above conditions can be effectively carried out by means of a later-mentioned water vapor heat treatment apparatus shown in FIG. 6.

The contact with water may be carried out by immersing the gel member into water after the exposure. By immersion into water, the hydrolysis is promoted more effectively as the temperature is higher and as the immersion time is longer.

However, in the case where the metal element contains Pb, the Pb component may be eluted if the immersion time is long. The composition change may occur. Therefore, the immersion time is preferably shortened to such a degree that the voids, etc. are not formed because of the residual organic substances due to insufficient hydrolysis at the time of solidification.

The heat treatments carried out at 200° C. to 400° C. in the two preferable embodiments are preferably carried out in a water vapor atmosphere. More preferably, the heat treatments are carried out in an oxygen atmosphere, a water vapor atmosphere in a carrier gas flow of oxygen or air, preferably in a water vapor stream atmosphere. This promotes diffusion of gas components of the voids generated inside the metal oxide. At the same time as diffusion and removal of the gas components, the metal oxide can be densified by thermal diffusion.

Figure 6:
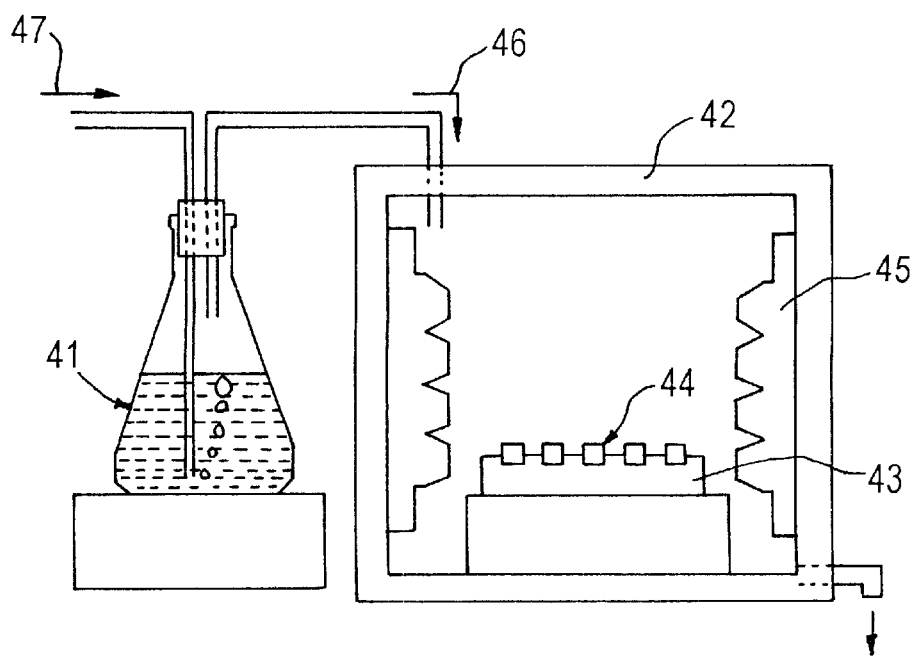
FIG. 6 is a schematic cross-sectional view illustrating an example of an apparatus for conducting a heat treatment on a gel member under a water vapor atmosphere.

FIG. 6 is a schematic cross-sectional view illustrating an example of an apparatus for conducting a heat treatment on a gel member under a water vapor atmosphere in a carrier gas flow of oxygen or air after the exposure to the water vapor (hereafter referred to simply as a "water vapor heat treatment apparatus"). The water vapor heat treatment apparatus schematically is composed of a water vapor generator (41) and a water vapor atmosphere electric furnace (42). The gel member (44) on the mold (43) is heated by a heater (45) in the electric furnace (42). By introducing a carrier gas (47) into hot water, water vapor (46) can be introduced into the electric furnace to heat-treat the gel member in a water vapor atmosphere.

Thus, in the solidifying step, as a preferable embodiment of the present invention, it is most preferable that the gel member is exposed to a vapor containing a water vapor and is heat-treated at 200 to 400° C., followed by a further heat treatment at not less than 400° C. This further heat treatment can effectively carry out the densification or crystal growth of the metal oxide.

In the following step, the metal oxide obtained in the solidification step is released from the mold. At this time, if the metal oxide is released from the mold using a resin, the flaws and cracks are less likely to be formed even if PLZT having a small mechanical strength is handled. Also, if an insulating material is used, the electric insulation between adjacent elements can be achieved easily. In the present invention, an electrode may be optionally formed on the metal oxide after the metal oxide is released. In the present invention, the releasing step may be omitted if the metal oxide arranged in an array on the mold is to be used integrally with the mold or separately as individual pieces. Even if the releasing step is omitted, a metal oxide having a fine shape can be produced with good productivity. If the metal oxide is to be used integrally with the mold, the material for the mold is preferably selected by taking this into account. If the metal oxide is to be used separately as individual pieces, the process of releasing the metal oxide from the mold can be omitted by using, as the mold material, a resin-based material that is decomposed by the heat treatment in the solidification step.

Hereinafter, the method of the present invention will be explained with reference to FIGS. 7(a)–7(f) illustrating an example of a flowchart in which the present invention is applied to production of an optical shutter array shown, for example, in FIG. 7(g). Namely, if an electrode is to be formed on a metal oxide constituting a desired functional device, an electrode (15) of aluminum, gold, or platinum is formed on a metal oxide fiber (14) on the mold (11) by a known thin film-forming means such as the mask deposition method or the sputtering method (step (i) in FIG. 7(a). Thereafter, a resin (16) (hereafter referrred to as "resin A" is pressed onto the metal oxide fibers (14) arranged in a array on the mold (step ) (ii) in FIG. 7(b), and then the resin is pulled up to release the metal oxide from the mold, followed by the inversion of the metal oxide (step (iii) of FIG. 7(c).

The above resin A is not specifically limited as long as it has an adhesion properties of such a degree that the metal oxide can be released from the mold in order to construct a substrate of a functional device as described later and as long as it has a insulating properties. For example, the resin A may be an epoxy resin or an insulating wax.

The metal oxide integrated with the resin A as obtained in the above step (hereafter referred to as "metal oxide molded product") may be used as it is, as a functional device after the resin A is hardened. Alternatively, an electrode may be further formed on the metal oxide after a process of polishing the end surface is carried out in accordance with the needs.

Figure 7A:
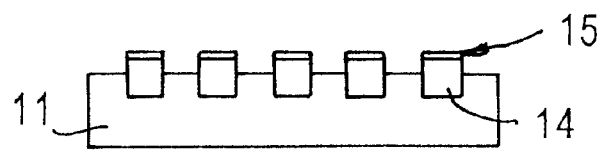
FIGS. 7(a)–7(f) are views showing a flowchart from an electrode-forming step to a finishing step in producing a fiber array shown in FIG. 7(g)
Figure 7A:
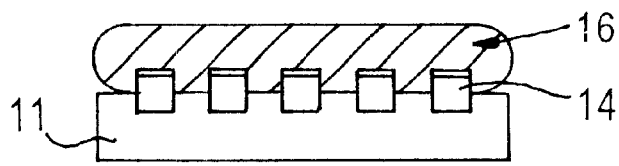
Figure 7A:
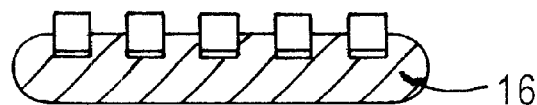
Figure 7A:
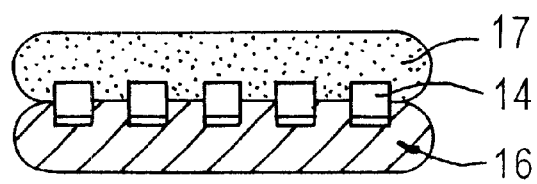
Figure 7E:
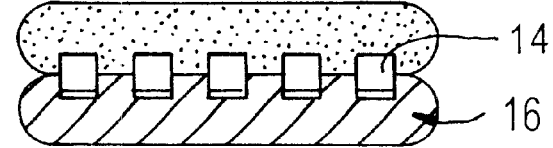
Figure 7E:
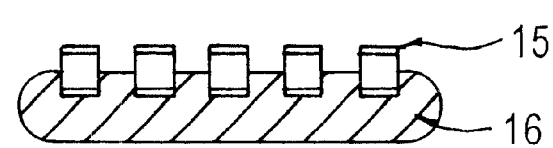
Figure 7G:
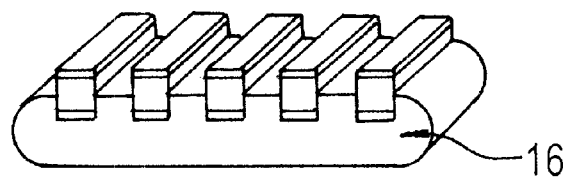

In carrying out the process of polishing the end surface of the metal oxide molded product, a resin (17) for fixing the metal oxide (hereafter referred to as "resin B") is applied as shown in step (iv) in FIG. 7(d) and the process of polishing both end surfaces in parallel is carried out by means of a polishing apparatus (step (v) in FIG. 7(e).

Thereafter, the resin B is removed and an electrode (15) may be optionally formed (step (vi) in FIG. 7(f).

The resin B is not specifically limited as long as it can fix the metal oxide. However, since it is preferable that the resin B is removed easily in a later-performed process of removing the resin B, a solid wax capable of being easily decomposed by heat or capable of being dissolved in an organic solvent for removal is effectively used.

Therefore, although the removal means used later depends on the kind of the resin B, the resin B need not be completely removed as long as the surface is exposed to such a degree that an electrode can be further formed on the metal oxide surface if the remaining resin B does not give any adverse effects to the efficiency of the functional device.

In the present invention, the metal oxide on a mold obtained by molding the sol using the mold formed in an array followed by gelation and solidification is released from the mold together by using a resin and is inverted on the resin, so that the need for arranging individually the fine metal oxides can be eliminated. Therefore, the conventional problem such as the breakage of the fine metal oxides can be avoided. The productivity of the functional devices according to the present invention is considerably improved and its production costs are considerably reduced.

Hereafter, the present invention will be explained with reference to the following Examples.

EXAMPLES

Example 1

Example 1 shows a case in which the production method of the present invention is applied to a PLZT thin film.

In this Example, a sol solution containing 2-methoxyethanol lead acetate trihydrate:lanthanum isopropoxide:zirconium propoxide titanium isopropoxide:ethanol:water=6:1.001:0.09:0.635:0.342:20:2 in a molar ratio was prepared according to the following procedure.

First, lanthanum isopropoxide was dissolved in 2-methoxyethanol by heating at 90° C. After the solution was left to cool, lead acetate trihydrate was added and dissolved by heating at 70° C. (solution A). Separately from the solution A, titanium isopropoxide and zirconium propoxide were sequentially added and mixed in ethanol of an amount which is half of the total amount in a molar ratio (solution B). The solution A was put into the solution B and mixed. The obtained mixture solution was refluxed at 78° C. for two hours and left to cool to room temperature. Then, a mixed solvent containing the remaining ethanol and water was dropwise added and stirred to prepare a homogeneous sol solution (solution C). The solution C was left to stand for two hours and was applied onto a surface of a silicon substrate with platinum phase (111) oriented, by means of a spin coating apparatus at 3,000 rpm. The applied film dried immediately in an ambient atmosphere to become a gel film.

The obtained gel film sample was heat-treated in a water vapor atmosphere at 200° C. and under 1.5 MPa for 30 minutes by means of a high-temperature high-pressure water vapor processing apparatus shown in FIG. 1 to hydrolyze the organic metal compound.

FIG. 1 is a schematic construction view illustrating an embodiment of a high-temperature high-pressure water vapor processing apparatus. Water (2) is introduced to a bottom of a closed vessel (1) and a sample-receiving vessel including a body (4) with a gel film (3) to be treated and a lid (5) is mounted on a supporting table (9) surrounded by water. The closed vessel (1) is put into an oven (8), which is heated to a given temperature to generate a water vapor and to heat the gel film to a given temperature. The pressure in the closed vessel is suitably adjusted by a pressure meter (6) and a pressure adjusting valve (7).

Figure 2:
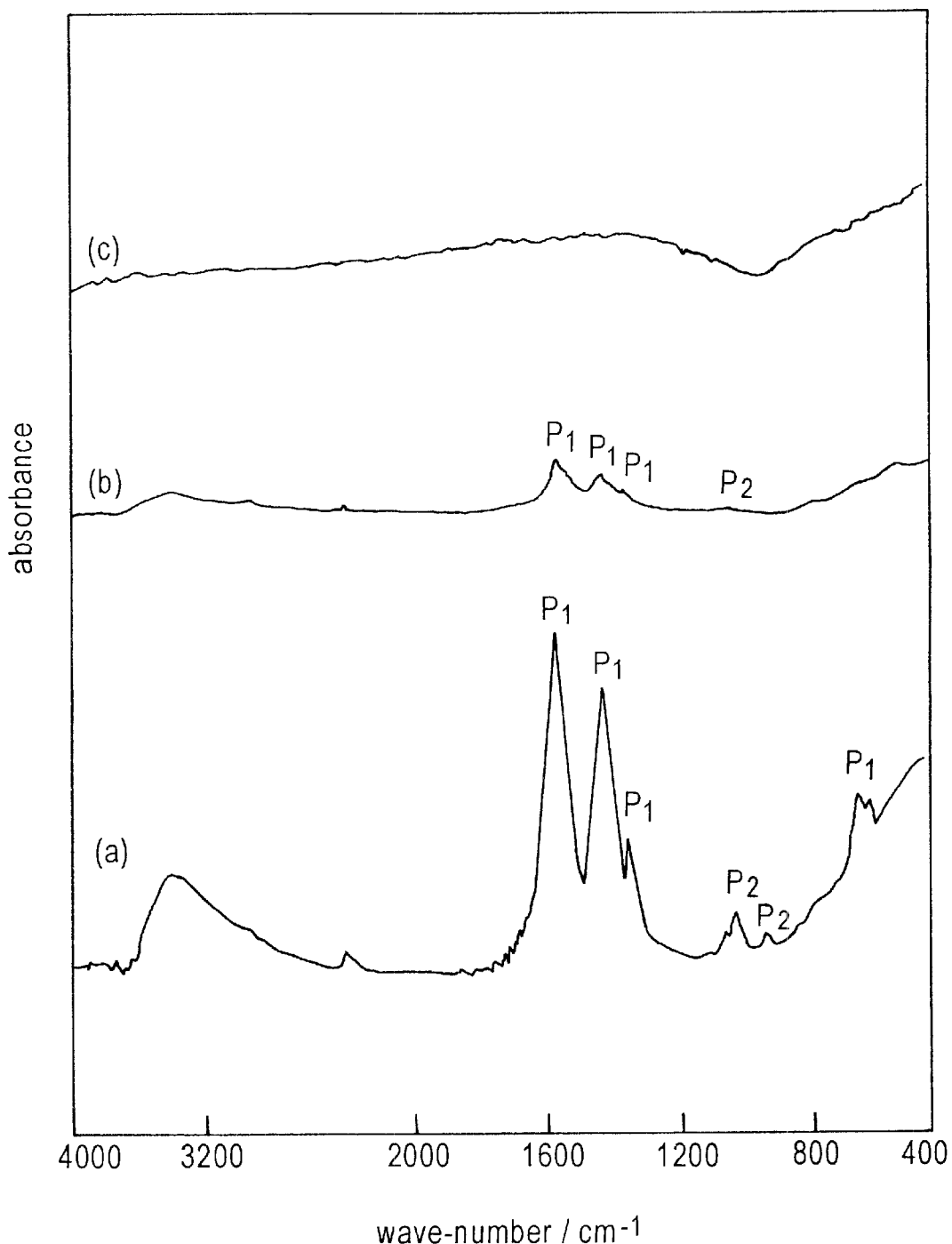
FIG. 2 is a FT-IR spectra of a gel film (a), a thin film obtained by subjecting the gel film to a heat treatment (b), and a thin film obtained by subjecting the gel film to a high-temperature high-pressure water vapor processing followed by a heat treatment (c)

The obtained sample was heated at 300° C. for 20 minutes to vaporize the free organic components. In order to compare the removal state of the organic substances, FIG. 2 shows FT-IR spectra of samples heat-treated at 300° C. for 20 minutes and those which were not subjected to the heat treatment with respect to the samples subjected to a high-temperature high-pressure water vapor processing and those which were not subjected to the water vapor processing. In the case of an unprocessed gel film (a), absorption peaks ($P_1$, $P_2$) belonging to lead acetate and ethanol were observed. In the case of a gel film (b) subjected to a heat treatment at 300° C. for 20 minutes, these peaks became smaller and became a little smaller by increasing the heat treatment time. However, these peaks never disappeared. On the other hand, in the case of a gel film (c) subjected to a high-temperature high-pressure water vapor processing, the absorption peaks belonging to the organic substances were not observed at all, indicating that the organic substances were completely removed.

In the last step, a heat treatment was conducted at 700° C. for 10 minutes for crystallization.

SEM observation confirmed that the sample which had not been subjected to a high-temperature high-pressure water vapor processing contained voids of about 0.1 to 0.3 $\mu$m, whereas the sample which had been subjected to a high-temperature high-pressure water vapor processing was dense with no pinholes on the surface and no defects such as voids inside the sample. The crystal phase was perovskite and preferentially oriented in a (111) surface, so that the sample was found to be excellent in orientation by an X-ray diffraction peak shape as compared with the sample which had not been subjected to the high-temperature high-pressure water vapor processing.

Example 2

Example 2 shows a case in which the production method of the present invention is applied to a PZT thin film.

A sol solution containing 2-methoxyethanol:lead acetate trihydrate:zirconium propoxide:titanium isopropoxide:ethanol:water=6:1.001:0.5:0.5:20:2 in a molar ratio was prepared according to the following procedure.

First, lead acetate trihydrate was added into 2-methoxyethanol and dissolved by heating at 70° C. (solution D). Separately from the solution D, titanium isopropoxide and zirconium propoxide were sequentially added and mixed in ethanol of an amount which is half of the total amount in a molar ratio (solution E). The solution D was put into the solution E and mixed. The obtained mixture solution was refluxed at 78° C. for two hours and left to cool to room temperature. Then, a mixed solvent containing the remaining ethanol and water was dropwise added and stirred to prepare a homogeneous sol solution (solution F). The solution F was left to stand for two hours and was applied onto a surface of a silicon substrate with a platinum phase (111) oriented, by means of a spin coating apparatus at 3,000 rpm. The applied film dried immediately in an ambient atmosphere to become a gel film.

The obtained gel film sample was heat-treated in a water vapor atmosphere at 130° C. and under 0.2 MPa for 30 minutes by means of a high-temperature high-pressure water vapor processing apparatus similar to that of Example 1, to hydrolyze the organic metal compound.

The obtained sample was heated at 270° C. for 20 minutes to vaporize the free organic components.

In the last step, a heat treatment was conducted at 550° C. for 10 minutes for crystallization.

SEM observation confirmed that the sample was dense with no pinholes on the surface and no voids leading to decrease in the dielectric constant and decrease in the piezoelectric effect were observed inside the sample. The crystal phase was perovskite and preferentially oriented in a (100) phase.

Example 3

Example 3 shows a case in which the production method of the present invention is applied to a $LiNbO_3$ thin film.

A sol solution containing 2-methoxyethanol:metal lithium:niobium ethoxide: diethanolamine:ethanol:water 70:1:1:2:20:0.8 in a molar ratio was prepared according to the following procedure.

First, metal lithium was dissolved into 2-methoxyethanol under the dried nitrogen atmosphere. To the obtained solution, niobium ethoxide was added, and diethanolamine was dropwise added for stabilization of the solution. Then, a mixed solvent containing ethanol and water was dropwise added and stirred to prepare a homogeneous sol solution. The solution F was applied onto a surface of a silicon substrate with a platinum (111) phase oriented, by means of a spin coating apparatus at 3,000 rpm. The applied film dried immediately in an ambient atmosphere to become a gel film.

The obtained gel film sample was heat-treated in a water vapor atmosphere at 1 50° C. and under 1.0 MPa for 30 minutes by means of a high-temperature high-pressure water vapor processing apparatus similar to that of Example 1, to hydrolyze the organic metal compound.

The obtained sample was heated at 300° C. for 20 minutes to vaporizer the free organic components.

In the last step, a heat treatment was conducted at 500° C. for 10 minutes for crystallization.

SEM observation confirmed that the sample was dense with no pinholes on the surface and no voids leading to decrease in the dielectric constant and decrease in the electrooptical effect were observed inside the sample. The crystal phase was an ilmenite-type crystal structure and preferentially oriented in a (100) phase.

Example 4

An example will be explained in which the present invention is applied to a PLZT optical shutter device.

A PLZT sol was prepared according to the following procedure.

A sol solution containing 2-methoxyethanol:lead acetate trihydrate:lanthanum isopropoxide:zirconium propoxide:titanium isopropoxide:ethanol:water= 6:1.001:0.09:0.635:0.342:20:2 in a molar ratio was prepared according to the following procedure.

First, lanthanum isopropoxide was added in 2-methoxyethanol and dissolved by heating at 90° C. After the solution was left to cool, lead acetate trihydrate was added and dissolved by heating at 70° C. (solution A). Separately from the solution A, titanium isopropoxide and zirconium propoxide were sequentially added and mixed in ethanol of an amount which is half of the total amount in a molar ratio (solution B). The solution A was put into the solution B and mixed. The obtained mixture solution was refluxed at 78° C. for two hours and left to cool to room temperature. Then, a mixed solvent containing the remaining ethanol and water was dropwise added and stirred to prepare a homogeneous PLZT sol solution (solution C). Then, the solution C was concentrated at 140° C. for two hours by means of a rotary evaporator (solution D).

Subsequently, PLZT fibers were molded according to the following procedure, which is explained with reference to FIG. 3 and FIGS. 5 to 6. FIG. 3 is a schematic construction view illustrating an injection molding apparatus. FIG. 3(a) is a schematic sectional view seen from the direction of fiber axis. FIG. 3(b) is a schematic cross-sectional view cut along the A–A' line of FIG. 3(a). FIG. 5 is a schematic cross-sectional view illustrating an apparatus for exposing a gel member to a water vapor. FIG. 6 is a schematic cross-sectional view illustrating an apparatus for conducting a heat treatment.

First, the PLZT sol (solution D) (12) was introduced by means of an injection molding apparatus as shown in FIG. 3(b) to fill a space between an upper mold (10) (made of silicon) and a lower mold (11) (made of silicon) as shown in FIG. 3(a). Both of the upper and lower molds had been processed by reactive ion etching. The molding surface of the upper mold (10) was coated with paraffin. The resultant was left to stand quietly at room temperature for 10 days for aging. Then, the upper mold (10) was removed (released) and the PLZT sol was exposed to water vapor at 200° C. under 1.5 MPa for two hours by means of the water vapor exposure apparatus shown in FIG. 5. Then, the resultant was heat-treated at 300° C. for 1 hour in a water vapor atmosphere by bubbling with a carrier gas (47) of oxygen in an electric furnace (42) shown in FIG. 6. It was confirmed by infrared absorption spectrum measurement that, at this stage, the metal oxide fibers (14) were an inorganic amorphous product (metal oxide) with almost no residual organic substances. Thereafter, a heat treatment was carried out at 700° C. for 30 minutes for densification of the metal oxide (making the metal oxide transparent) and crystallization (deposition of perovskite crystal exhibiting an electrooptical effect).

FIG. 7 shows steps from the formation of an electrode to the formation of an device.

After the heat treatment, an aluminum electrode (15) was formed by mask vapor deposition on an upper surface of the metal oxide fibers (14) (step (i)). Then, as a resin A (16), an epoxy adhesive (with a viscosity of about 300,000 mPas) was pressed (step (ii)) to release (transcribe and separation) the metal oxide fibers (14) and inverted (step (iii)). Further, a thermoplastic wax (resin B (17)) was applied on the released side for fixation (step (iv)), and both end surfaces of the metal oxide fibers (14) were polished in parallel (step (v)). After the polishing, the wax was removed by acetone, and finally an aluminum electrode (15) was formed by mask vapor deposition to produce a PLZT optical shutter device (step (vi)). Through these steps, the breakage of the metal oxide fibers did not occur at all.

PLZT optical shutter devices were fabricated in the same manner as in the above Example except that the processing conditions in the water vapor exposure apparatus illustrated in FIG. 5 were changed as shown in the following Table 1. The above Example corresponds to Experimental Example 9 in the following Table 1.

TABLE 1

| Experimental Example | Temperature (° C.) | Time (minutes) | Pressure (MPa) | Contact with water (Yes/No) | Transparency |
|---|---|---|---|---|---|
| 1 | 120 | 120 | 0.1 (Atmospheric pressure) | No | Opaque |
| 2 | 120 | 120 | 0.1 (Atmospheric pressure) | Yes | Translucent |
| 3 | 150 | 120 | 0.1 (Atmospheric pressure) | No | Translucent |
| 4 | 150 | 120 | 1.5 | No | Transparent |
| 5 | 150 | 60 | 0.8 | No | Transparent |
| 6 | 200 | 120 | 0.1 (Atmospheric pressure) | Yes | Transparent |
| 7 | 200 | 120 | 0.12 | No | Transparent |
| 8 | 200 | 120 | 0.14 | No | Transparent |
| 9 | 200 | 120 | 1.5 | No | Transparent |
| 10 | 200 | 30 | 1.5 | No | Transparent |
| 11 | 300 | 120 | 0.3 | No | Transparent |
| 12 | 300 | 60 | 0.8 | No | Transparent |
| 13 | 300 | 30 | 1.5 | No | Transparent |
| 14 | 400 | 120 | 1.3 | No | Transparent |
| 15 | 400 | 30 | 1.5 | No | Translucent |

The water vapor exposure process in Experimental Examples 2 and 6 was carried out by exposing the metal oxide fibers to a vapor containing a water vapor with a carrier gas of oxygen at the temperatures shown in Table 1 under an atmospheric pressure for 120 minutes in a water vapor heat treatment apparatus shown in FIG. 6 used also in the later-performed heat treatments, followed by immersion in water.

As will be apparent from the above description, according to the method of the present invention, functional devices can be fabricated easily with good productivity without causing problems such as breakage even if the metal oxide has a fine complicated shape. It is clearly understood that, in the temperature ranges of 150 to 300° C., the exposure time can be shortened more as the processing temperature is higher or as the pressure is higher, thereby achieving further cost reduction. It is clear that, if the water vapor exposure processing condition is too strong or too weak, that is, if the applied pressure is 1.5 MPa or more in the case where the processing temperature is 400° C. or more, and if the applied pressure is 0.1 MPa or less in the case where the processing temperature is 1 50° C. or less, there will arise a problem in the transparency of the metal oxide. This seems to be due to the following reasons. If the processing condition of the water vapor exposure process is too strong, the organic substances are carbonized before hydrolysis, so that they are less likely to be hydrolyzed, and it is also not preferable for densification after the heat treatment. On the other hand, if the processing condition is too weak, the hydrolysis and polymerization do not take place effectively.

According to the first aspect of the present invention, a gel film made of a material containing an organic metal compound formed on a supporting member such as a substrate is subjected to a water vapor processing at a high temperature and under a high pressure before a heat treatment at a high temperature, so as to effectively hydrolyze the organic metal compound and to effectively remove the generated organic substances. Therefore, by the later-performed heat treatment, a dense metal oxide thin film can be produced without defects such as pinholes on the surface thereof and without the presence of voids or the like that lead to decrease in the dielectric constant or the electrooptical effect in the inside thereof.

According to the second aspect of the present invention, a functional device in which metal oxides are arranged in an array on a substrate can be produced easily with good productivity. In this case, the productivity can be further improved by adjusting the water vapor exposure condition.

What is claimed is:

1. A method for production of a highly dense metal oxide thin film, comprising the steps of:

preparing a sol containing a material and a solvent and forming a thin film on a substrate using the sol;

gelating the thin film of the sol to give a gel film;

processing the gel film under pressure of not less than 0.2 MPa at 100 to 400° C. in a water-vapor-containing atmosphere; and conducting a heat treatment on the water-vapor-processed film at 200 to 400° C.

2. A method of claim 1, further comprising a step of conducting a heat treatment on the heat-treated film at not less than 400° C.

3. A method of claim 1, in which the solvent is an alcohol solvent.

4. A method of claim 1, in which the water vapor processing step is conducted under a pressure of 0.5 to 2 MPa at 130 to 200° C.

* * * * *